United States Patent [19]

Bara

[11] 3,797,780

[45] Mar. 19, 1974

[54] TWO DIRECTIONAL TAPE CASSETTE PLAYER

[75] Inventor: Edwin S. Bara, Elmwood, Ill.

[73] Assignee: Warwick Electronics Inc., Chicago, Ill.

[22] Filed: Jan. 17, 1972

[21] Appl. No.: 218,266

Related U.S. Application Data

[63] Continuation of Ser. No. 831,077, June 6, 1969.

[52] U.S. Cl. .................... 242/200, 360/96, 242/206

[51] Int. Cl.... G11b 5/00, G11b 15/32, G11b 23/04

[58] Field of Search ............ 274/4 B, 4 C, 4 E, 4 F, 274/4 G, 4 D, 11 B, 11 C, 11 D; 226/180, 183, 174, 186, 187; 242/198–200, 186, 189, 201–203, 208, 209, 55.19 A

[56] References Cited

UNITED STATES PATENTS

| | | | |
|---|---|---|---|
| 2,971,762 | 2/1961 | Zorn | 274/4 D |
| 3,038,678 | 6/1962 | Papst | 226/180 |
| 3,052,421 | 9/1962 | Fischer | 242/204 |
| 3,092,296 | 6/1963 | Andrews | 242/189 |
| 3,289,906 | 12/1966 | Schuller | 226/168 |
| 3,411,730 | 11/1968 | Kelley | 242/186 |
| 3,417,938 | 12/1968 | Markakis | 242/200 |
| 3,424,360 | 1/1969 | Trott | 226/168 |
| 3,516,616 | 6/1970 | Adell | 226/168 |
| 3,542,303 | 11/1970 | Auld | 226/183 |
| 3,578,335 | 5/1971 | Ban | 274/4 F |
| 3,580,525 | 5/1971 | Dopner | 242/189 |
| 3,285,612 | 11/1966 | Hallamore | 274/11 C |

*Primary Examiner*—Leonard D. Christian
*Attorney, Agent, or Firm*—Hofgren, Wegner, Allen, Stellman & McCord

[57] ABSTRACT

A tape cassette player having provision for slot loading of a cassette into tape playing position wherein an exposed length of tape extending between a pair of reels in the cassette is positioned along a tape path defined by at least one tape head and a tape drive wheel disposed in line along said tape path. The drive wheel engages a portion of the exposed length of tape against a non-rotatable part of the tape cassette to form a drive couple and feed the tape at a uniform speed. Operating mechanism including reel spindles drive the tape in either forward or reverse direction with mechanism responsive to the completion of tape travel, as evidenced by stopping of the tape reels in the cassette and the reel spindles, causing reversal of rotation of the tape drive wheel and of the drive to the reel spindles to cause the tape to commence travel in the opposite direction. The reversal of tape travel is caused by a sensing member which senses rotation of a tape reel and a reel spindle and which moves upon stoppage of the reel spindle to signal the tape reversal operation.

3 Claims, 9 Drawing Figures

INVENTOR.
EDWIN S. BARA

BY Hofgren, Wegner, Allen, Stellman & McCord.

ATTORNEYS.

TWO DIRECTIONAL TAPE CASSETTE PLAYER

BACKGROUND OF THE INVENTION

This is a continuation, of application Ser. No. 831,077 filed June 6, 1969.

This invention pertains to tape transducing mechanism and more particularly to a tape cassette player operating on the tape in two directions with automatic tape reversal.

Various tape players are known and in the past the bulk of these units have been used with tape on independent and separate supply and take up reels. More recently, a cartridge having an endless tape has been played on tape players with the design of the tape player being dependent upon the tape of tape cartridge. The most significant recent development has been a tape cassette wherein a relatively small cartridge rotatably mounts a pair of reels within the interior thereof and with a length of tape between reels exposed at one side of the cartridge. This cassette, in effect, miniaturizes the conventional supply and take up reels and permanently mounts them within the cartridge. The tape is permanently within the cartridge, and thus the ends of the tape are captured on the respective reels so that the tape will always be under control of the reels and can travel from one reel to the other.

The prior art tape players for playing tape cassettes have had provision for slot loading of the cassette, mechanism for driving one or the other of the cassette reels dependent upon the direction of tape travel, and a tape drive capstan insertable in an opening in the cassette for engagement with the tape against a back up roller. The tape cassette player disclosed herein has reel spindles for drive of the tape reels of the cassette but does not require any other structure to be inserted within the confines of the cassette through the walls thereof. This is accomplished by having a tape drive wheel outside the cassette engaging the tape against a non-rotatable part of the cassette to form a drive couple for feeding the tape at a controlled uniform speed.

The tape drive wheel engages the tape against the felt pad provided in the cassette normally for coaction with a tape head and it has been found that this engagement is sufficient to provide a firm tape driving couple therebetween. This location of the tape drive wheel then leaves two conventional openings in the cassette side wall into which two tape heads located one at either side of the tape drive wheel can move and curvingly deflect the tape to provide sufficient wrap for proper transducing of the tape.

The tape of the cassette has more than a single channel thereon and the player disclosed herein provides for automatic reversal of tape travel. Two-directional tape recorders are known which, in some manner, sense the end of tape and cause reversal of tape travel. Such systems have relied on sensing mechanism which senses openings in the tape or distinct patterns of electrically conducting material or other indicia on the tape to signal that the tape should be reversed. These systems have required direct exposure to the tape which is not practical with a tape cassette. The player disclosed herein has a unique reversal system responsive to the stopping of the tape reels when a captured end of the tape is reached and the tape can travel no further.

SUMMARY

An object of this invention is to provide a tape cassette player having provision for slot loading of the cassette in a path which advances an exposed length of the tape directly against the tape drive wheel and at least one tape head with a tape drive couple affected between the tape drive wheel and a non-rotatable part of the cassette which backs against the exposed length of tape.

Another object of the invention is to provide a tape cassette player having a pair of reel spindles for the two reels of the cassette and sensing mechanism for initiating reversal of the tape drive including at least one member which is frictionally held out of operative position by the rotation of a reel spindle and which is permitted to move and trigger tape reversal when the reel spindle stops as caused by the captured end of the tape being effective to stop the movement of the tape.

Another object of the invention is to provide a tape cassette player as defined in the preceding paragraph wherein there are a pair of said sensing members each of which are floatingly mounted and each of which is associated with an adjacent reel spindle and mounted thereto by a friction member which holds the sensing member out of operative position because of the frictional engagement with the rotating reel spindle and which moves when the reel spindle stops.

A further object of the invention is to provide a tape cassette player with automatic reversal of the tape travel by control of the reel spindles for the tape reels in the cassette and the direction of rotation of a tape drive wheel by mechanical mechanism including a pair of sensing members engageable with a drive shaft and with one or the other of the sensing members being operative, the operative sensing member being held out of active position by a frictional mounting thereof to the associated reel spindle and the rotation thereof with stopping of the rotation of the reel spindle permitting the sensing member in the form of a roller to be rotated by the drive shaft into wedging relation with a trip plate, and connections between the trip plate and a control bar for operating a reversible drive motor switch whereby movement of the trip plate caused by wedging of the sensing roller between the drive shaft and the plate causes movement of the bar and shaft of the switch to reverse the direction of rotation of the motor.

Another object of the invention is to provide a two directional tape cassette player having a main control member for controlling the direction of rotation of a drive motor for driving a tape drive wheel engageable with an exposed length of tape of the cassette, means dependent upon the direction of rotation of the tape wheel for rotating one or the other of a pair of reel spindles engageable with the cassette reels, and means for driving one or the other of the reel spindles at a fast rate including connections to the main control member for movement thereof to cause rotation of the drive motor in one direction and movement of the tape drive wheel out of engagement with the exposed length of tape to permit fast travel of the tape.

A further object of the invention is to provide a tape cassette player for a tape cassette having two internal tape reels with an exposed length of tape extending therebetween including a base, a drive motor, a drive shaft having a drive pulley movably mounted on said base with an elastic belt extending between said pulley and an idler pulley, a tape drive wheel floatingly mounted on said base for movement between limit positions with the tension of the belt urging the drive shaft against the tape drive wheel and toward the exposed length of tape, a member actuable to move the drive shaft against the tension of the belt and to move the cassette locating structure to a position to permit insertion or removal of a cassette, means causing said tape drive wheel to move with said drive shaft, a pivoted control bar having a central off position and alternate operative positions for control of a switch for the reversible drive motor to cause operation of the tape cassette player to move the tape in one direction or the other in a transducing operation, a pair of secondary control members for causing operation in either fast forward or fast rewind operation including interconnections with said control bar to operate the motor switch for operation of the motor in the desired direction, for shifting said tape drive wheel and for engaging an intermediate drive to drive one of said reel spindles at a fast rate, and reversing means for the tape drive responsive to stoppage of tape travel.

DESCRIPTION OF THE PREFERRED EMBODIMENT

Figure 7:
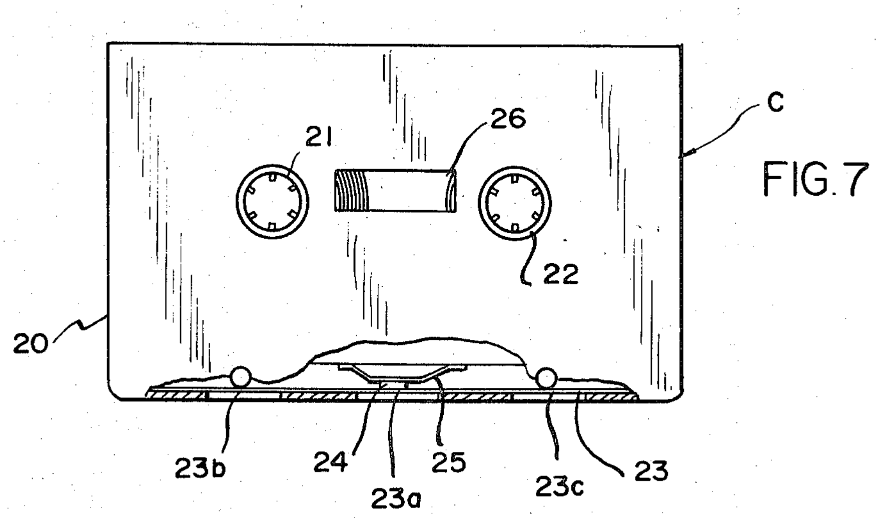
FIG. 7 is a plan view of a tape cassette with parts thereof broken away.

The tape cassette player disclosed herein is for playing of a tape cassette as shown in FIG. 7. This cassette indicated generally at C has a cartridge casing 20 mounting a pair of tape reels within the cartridge and the cartridge has openings 21 and 22 into which reel drive spindles extend and interlock with the central openings in the reel. The tape is captured at its ends on the reels so that as the tape has completely moved in one direction of travel the trailing end is locked on the associated reel with the result that the tape stops and the rotation of the driven reel stops. An exposed length of tape 23 extends along an open side of the cassette with a central portion **23*a* thereof being backed by a felt pad 24 carried on a spring member 25. Portions 23*b* and 23*c* of the tape are also exposed. The casing 20 has guide posts (not shown) at either side of the tape portions 23*a*, 23*b* and 23*c* to facilitate the wrap-about components to be described. In the conventional player for such a cassette, a tape transducing head engages the portion 23*a* and a drive capstan can be inserted through openings in the cartridge to lie behind either the portion 23*b* or 23*c* of the tape. A window 26** permits viewing the interior of the cassette to check the wound condition of the tape on the reels.

Figure 1:
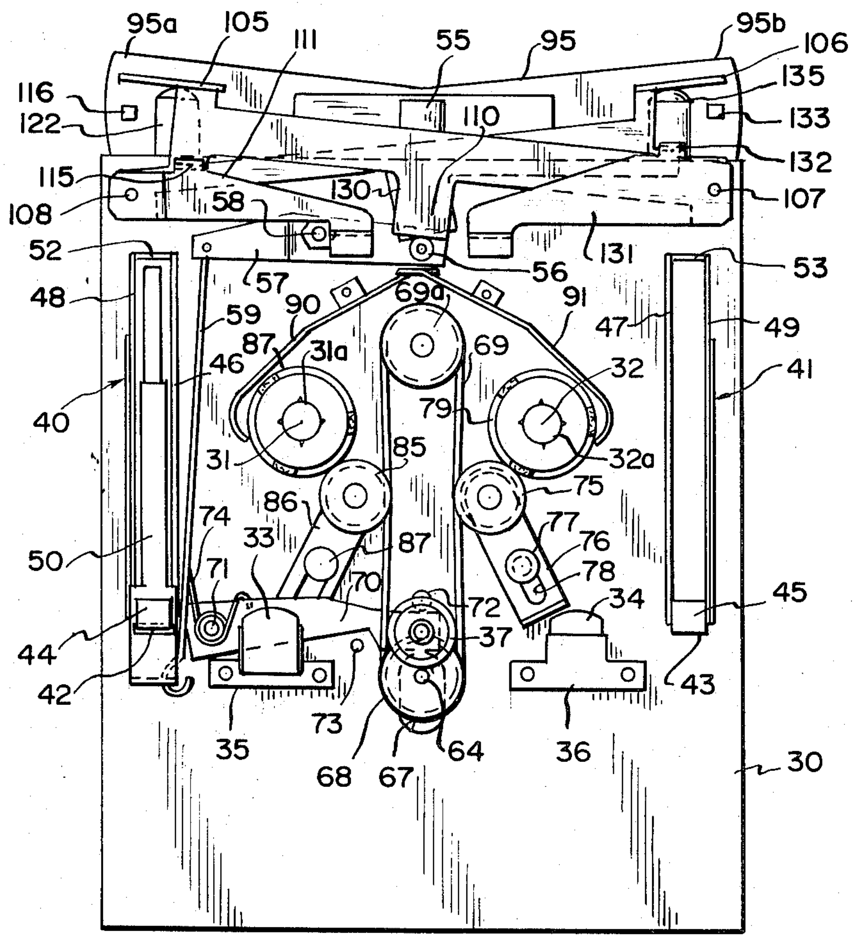
FIG. 1 is a front elevational view of the tape cassette player.

The tape cassette player disclosed herein is mounted in a suitable exterior casing for appearance, however, such casing has been omitted to more clearly show the operative parts of the tape cassette player. Referring to FIG. 1, a mounting base 30 mounts a plurality of components having direct operative interaction with the cassette C. A pair of reel driving spindles 31 and 32 are rotatably mounted on said base 30 and have yieldable toothed driving members **31*a* and 32*a*, respectively, which interengage with the inner openings of the reel for interlocked drive relation. A pair of tape transducing heads 33 and 34 are mounted on said base at a distance therefrom by brackets 35 and 36, respectively. These heads lie in a line along a tape path when a cassette is positioned in the player. A rotatable tape driving wheel 37 of rubber or other suitable friction material has its upper surface disposed generally along the line defined by the heads 33 and 34. In actual practice, the wheel 37** may be located slightly above this line.

Figure 4:
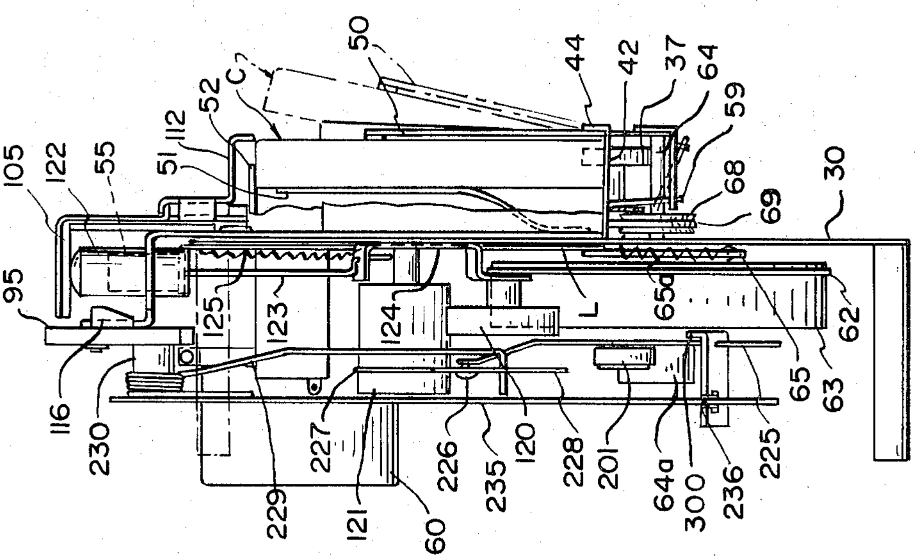
FIG. 4 is a side elevational view of the tape cassette player taken generally along the line 4—4 in FIG. 3 and showing a cassette in operative position in full line and the mechanism and a cassette shown in broken line in loading position.

The tape player as disclosed is designed for playing of a cassette in an upright position as shown in FIGS. 1 and 4, however, with suitable modification within the skill of one skilled in the art as by use of springs where required to replace gravity, the unit could have the parts arranged for playing of cassettes with the player in a horizontal position.

With a cassette positioned in the player as shown in full line (FIG. 4) the tape has been moved against the heads 33 and 34. The heads extend into the cartridge a sufficient distance to cause the tape to be curvingly deflected thereabout to provide sufficient wrap on the heads which in combination with back tension, produced in a manner to be hereinafter described, permits satisfactory tape transducing without the use of conventional pressure pads. The tape drive wheel 37, if in its operative position as determined by mechanism subsequently described, will engage the exposed tape portion **23*a* against a nonrotatable part of the cassette, namely, the felt pad 24, and these parts define a feed couple for the tape to drive the tape at a constant speed for transducing. It has been discovered that the tape can be driven satisfactorily by pressing it against the felt pad. With this construction, the only interfitting required between the cassette and the player is the connection between the reel drive spindle members 31a and 32a with the reels of the cassette. The advance of the cassette into playing position has moved the exposed length of tape directly into the tape path and into operative position with the transducing heads and the tape drive wheel 37.**

Figure 2:
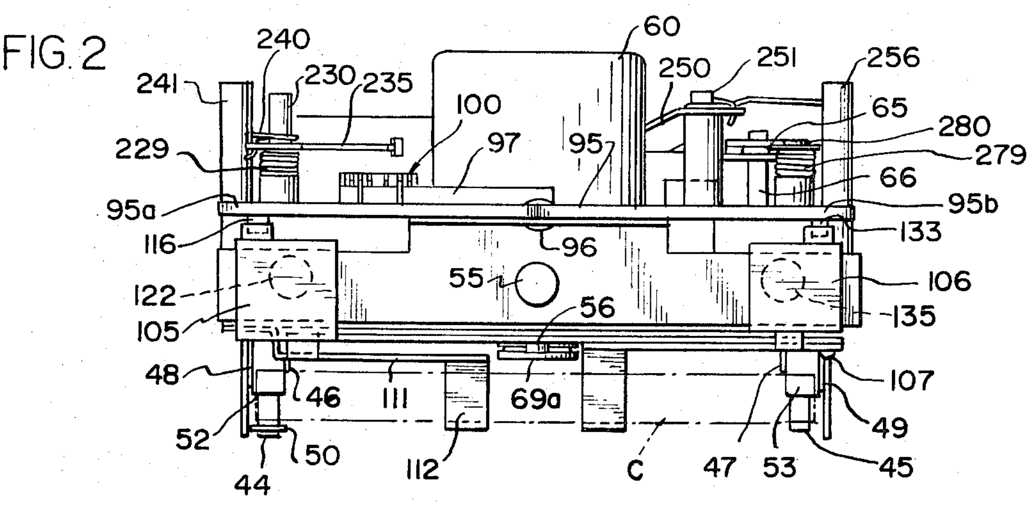
FIG. 2 is a plan view of the tape cassette player with a cassette shown in operative position in broken line.

The cassette is loaded into the player by a slot loading action and is guided by both fixed and movable structure mounted on the base 30 which guides the cassette into operative position as it is manually loaded and which then finally positions the cassette in operative position. A pair of cassette guiding and supporting units indicated generally at 40 and 41 are mounted on the base 30 and have a pair of outwardly extending base members 42 and 43 of the respective units with upturned ends 44 and 45, respectively, which define a seated position for the cassette C. The distance of the cassette C from the base 30 is defined by the front edges of a pair of plates 46 and 47 of the units which engage behind the cassette as seen in FIG. 2. The lateral positioning of the cassette is determined by the plates 48 and 49 which extend outwardly from the base further than the plates 46 and 47 to engage the ends of the cassette casing. The cassette is inserted at an angle to the vertical as shown in broken line in FIG. 4 and after being seated against the bottom members 42 and 43 it is moved to a vertical position by a pivoted lever 50 pivoted on the bottom member 42 and which in the upright full line position as shown in FIG. 4 positions the cassette C against a leaf spring 51 and under a pair of top guide members 52 and 53 of the units 40 and 41. The position of the lever 50 in either full or broken line position in FIG. 4 is controlled by a linkage operated from a push-button 55 at the top of the player and to the rear of the mounting base 30. The push-button 55 is connected to a pin 56 extending through an elongated vertical slot in the mounting base 30 whereby up and down movement of the button 55 results in up and down movement of the pin 56. The pin 56 is connected to a lever 57 forwardly of the mounting base 30 and the lever is pivoted intermediate its ends to the mounting base at 58. An end of the lever is pivotally connected to a downwardly extending link 59 which at its lower end hooks onto the cassette positioning lever 50. With the push-button in its raised position, the parts are positioned as shown in full line in FIG. 4 with the cassette C in its playing position. When the button 55 is depressed, the positioning lever 50 is pivoted to the broken line position in FIG. 4 and the spring 51 is effective to pivot the cassette C outwardly to an inclined position where it can be removed from the player and the next cassette inserted.

The push-button 55 performs an additional function to control the position of the tape drive wheel 37.

The tape drive wheel 37 is driven from a drive train including a reversible electric motor 60 mounted on the rear of the mounting base 30 and having an output shaft with a drive pulley 61 which drives a belt 62 wrapped about a flywheel 63 fixed to a drive shaft 64 and having a reduced diameter section 64*a* forming an enlargement of the drive shaft 64 at the rear thereof. The drive shaft 64 and flywheel 63 are mounted on a bracket 65 immediately to the rear of the base 30 and which is pivoted on a fixed pin 66 and which mounts the flywheel and drive shaft for up and down movement. The drive shaft 64 extneds forwardly through a slot 67 in the base (FIG. 1) to underlie the tape drive wheel 37. The mounting bracket 65 and the parts carried thereby are yieldably urged upwardly by a spring 65*a* connected between an end of the bracket and the base 30. The drive shaft 64 has a drive pulley 68 about which an endless elastic belt 69 extends and wraps about an idler pulley 69a disposed about the drive pulley 68.

The push-button 55 has a link L at the rear of the base 30 connecting the push-button to the bracket 65 whereby depression of the button pivots the bracket 65 downwardly and lowers the drive shaft 64. Release of the push-button which is releasably held in a depressed position results in return of the parts to the position shown in FIG. 1 with the drive shaft 64 in engagement with the tape drive wheel 37.

The tape drive wheel 37 is mounted at the end of a pivoted arm 70 which is pivoted to the base 30 at 71 and can move between an upper limit position as shown in FIG. 1 wherein the arm 70 engages against a fixed pin 72 on the base 30 and a lower position where the arm abuts against a pin 73 on the base 30. The arm 70 and tape drive wheel 37 are urged clockwise as viewed in FIG. 1 by a spring 74 acting between the base and the arm to have the tape drive wheel 37 follow the drive shaft 64. when the player is not in use, the push-button 55 is depressed and held in that position which lowers the drive shaft 64 against the spring 65*a* and the tension of the elastic belt 69 to a level wherein it is out of engagement with the tape drive wheel 37 because of that wheel's movement being limited by the stop pin 73. This prevents formation of an irregularity on the surface of the drive wheel 37. When the push-button 55 is elevated the drive shaft 64 firmly pressed against the drive wheel 37 to hold it against the upper stop pin 72 and with the drive wheel in engagement with the portion 23*a* of the exposed length of tape of the cassette C.

Figure 8:
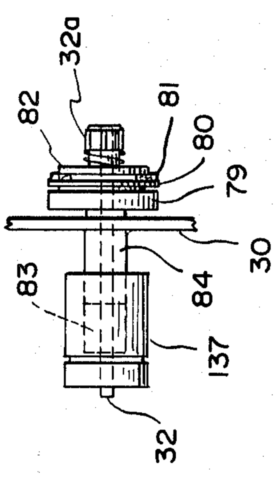
FIG. 8 is a detail plan view of a reel drive spindle.
Figure 9:
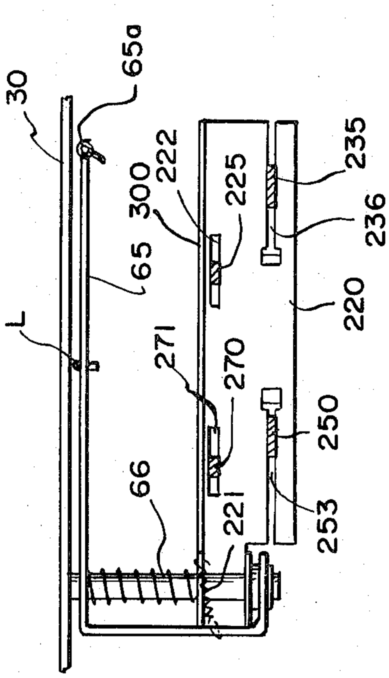
FIG. 9 is a plan section taken generally along the line 9—9 in FIG. 3.

The elastic belt 69 has the primary function of providing a drive for one or the other of the reel spindles 31 and 32 whereby one of the reel spindles is driven at the same time as the tape drive wheel 37 to provide for wind-up of the tape onto one of the cassette reels as it is advanced at a controlled rate by the tape drive wheel 37. Referring to FIG. 1, if the tape is moving from left to right and along the upper surface of the tape drive wheel 37 then the spindle 32 is to be driven in a counter-clockwise direction. This drive is from the elastic belt 69 and under the control of a floating idler roller 75 having a peripheral groove fitted against the elastic belt 69 and floatingly mounted on the base by a bracket 76. The bracket is slidably guided on the base 30 by a pin 77 on the base engaging in a coacting slot 78 in the bracket. This roller engages between the belt and a rubber wheel 79 (FIG. 8) loosely mounted on the reel drive spindle 32. The wheel 79 is clutched to the spindle by means of a metal disc 80 secured to the wheel 79 and engaging a series of felt pads 81 mounted on a disc 82 fixed to the reel spindle. As the drive shaft 64 rotates in a counterclockwise direction, as viewed in FIG. 1, the right-hand length of the endless belt 69 travels upwardly and causes rotation of the roller 75 to have the roller climb into firm engagement with the rubber wheel 79 which through the clutch causes rotation of the reel spindle 32. When rotation of the reel spindle is prevented, as by end of tape travel in the cassette, the clutch permits slipping and the reel drive spindle is stopped while the rubber wheel 79 continues to rotate. During this action, the left-hand length of the elastic belt 69 is traveling downwardly and there is no drive imparted to the reel drive spindle 31. The clutching action is derived from a spring 83 (FIG. 8) engaging a bushing 84 on the base and urging the reel spindle 32 rearwardly. When the tape travels in the opposite direction, the action is reversed with an idler roller 85 mounted on a movable bracket 86 similarly to the roller 75 engaging between the belt 66 and a rubber wheel 87 on the spindle 31 with the construction being the same as that described in connection with reel spindle 32. The left-hand length of belt 69 is traveling upwardly and causes roller 85 to move into drive position.

A pair of alternately operative drag members are provided to impart some drag to the reel spindle which is not driven, and provide sufficient back tension on the tape to ensure the desired tape wrap on the heads 33 and 34. When the reel spindle 31 is driven, the reel spindle 32 is rotating in a clockwise direction, due to pull of the tape, and a pivoted finger 91 engages the rubber wheel 79 to prevent its rotation in a clockwise direction and to thereby impart a slight drag on the spindle caused by the friction between the metal disc 80 and the felt pads 81 on disc 82. A corresponding finger 90 stops the rubber wheel 87 on spindle 31 to create a retarding force when the tape direction is reversed, i.e., spindle 32 is driven. The fingers 90 and 91 are so shaped that they merely ride on their respective wheels when they are driven to rotate in a clockwise and counterclockwise direction, respectively.

The mechanism described to this point provides for positioning of mechanism to facilitate loading and unloading and positioning of a tape cassette C, for controlling the position of a tape drive wheel 37 which engages the tape to cause movement thereof at a controlled speed, and for drive of a reel spindle. The tape player is a two directional unit providing for operation in either direction and control mechanism now to be described provides for this by control of the direction of rotation of the motor 60.

A main control bar 95 for controlling the drive motor 60 has a central position in which the motor is not energized and has depressible ends 95*a* and 95*b*. The control bar is pivoted at 96 to a flange 97 of the base 30 and has two tilted positions for controlling the direction of tape travel. When the control bar 95 is depressed manually at 95*b* for movement clockwise about its pivot 96, as viewed in FIG. 1, the motor is energized to cause play operation with tape travel to the right as viewed in FIG. 1 with tape being wound on a cassette reel by drive of the reel spindle 32 and with the tape drive wheel 37 rotating in a clockwise direction. Depression of the end 95*a* of the control bar 95 causes travel of the tape to the left with counterclockwise rotation of the tape drive wheel 37. The control bar 95 has an arm 97 connected thereto with a pair of switch blades 98 and 99 coacting with a motor control switch indicated generally at 100 in FIG. 3. Pivoting of the control bar from the central position will set the switch 100 in one position or the other beyond the intermediate neutral position to control energization of the motor 60. The control bar also has a depending plunger 101 (FIG. 3) which moves within a switch block, indicated generally at 102, having a number of terminals which control the condition of the tape transducing heads 33 and 34 to provide the proper record and playback operation of the heads depending upon the desired sequence of mode of operation and direction of tape travel.

With the push-button 55 in an elevated position to have the tape drive wheel 37 against the exposed length of tape and with power supplied to the player, the actuation of the main control bar 95 in one direction or the other from the central position will energize the drive motor 60 and set the tape heads 33 and 34 in proper operative condition for play of a tape in either direction of travel.

The control bar 95 can be maintained yieldably in any set position by a suitable spring loaded detent acting between the base 30 and the control bar (not shown).

The fast feed of the tape in the cassette for transfer of tape from one reel to the other and which may be referred to as fast forward and fast reverse operations is controlled by secondary control members 105 and 106 with the member 105 being a lever pivoted to the mounting base 30 at 105 (FIG. 1) and disposed in parallel planar relation and in front of the control member 106 which is a lever pivoted to the opposite side of the mounting base at 108. Depression of the control member 105 causes a downwardly extending flange 110 located approximately mid-way of the length thereof to engage the pin 56 on the lever 57 for the purpose of lowering the push-button 55 to have the link L pivot the bracket 65 and lower the drive shaft 64 against the tension of the elastic belt 69 and at the same time permit the tape drive wheel 37 to move down out of engagement with the portion 23*a* of the exposed length of the tape in the cassette C. Incidental to this motion is operation of the link 59 which throws the cassette retaining lever 50 outwardly to permit movement of the cassette away from operative position. Therefore, depression of the control member 105 also permits a pivoted catch member 111 also pivoted on the pivot 108 to descend, and permit a forwardly extending section 112 with a down-turned end to engage over the top forward corner of the cassette and hold it in position. This catch member 111 is caused to move down by gravity and the position thereof is controlled by interengaging surfaces between the control member 105 and the catch member 111, as indicated at 115. Depression of the control member 105 also causes pivoting of the control bar 95 by the top flange of the control member 105 engaging a forwardly extending tab 116 on the control bar (FIGS. 1 and 4). This energizes the drive motor 60. The engagement between the tape drive wheel 37 and the drive shaft 64 has been broken by depression of the link L connected to the push-button 55. The high speed drive to the reel spindle 31 is made by activation of an idler 120 which energizes between the flywheel 63 and an enlargement 121 on the reel drive spindle 31 at the rear of the base 30. This enlargement is a cylindrical member fixed to the spindle and formed of a relatively slippery material which is still sufficient to provide the drive to the reel spindle but has sufficient slip for a purpose set forth hereinafter. An example of such material is Delrin. The movement of the idler 120 into operative position is caused by the end flange of the control member 105 depressing an underlying button 122 which has the link 123 extending therefrom and with a shouldered end of the link engaging a floating bracket 124 carrying idler 120 and which is pinned by pin 126 to the mounting base for sliding and rotational movement. This bracket is urged upwardly by a spring 125 connected between the bracket and the base 30. When the button 122 is depressed by operation of the control member 105, the link 123 is moved downwardly and by the shouldered engagement with the bracket 124 causes a pivoting thereof about the bracket mounting pin 126 and moves the idler wheel into engagement with the flywheel and the enlargement on the reel spindle.

Fast operation of the tape in the other direction is caused by depresssion of the control member 106 which has a flange 130 engaging the pin 56 similar to the flange 110 of the control member 105 to cause throw off of the tape drive wheel 37 and retention of the cassette in operative position. A cassette catch member 131 pivoted at 107 on the frame is constructed similarly to the catch 111 and activated by interengaging surfaces 132 on the catch member 131 and the control member 106 whereby as the member 106 is depressed gravity causes the catch member 132 to move downwardly and retain the cassette Cain position. Depression of the control member 106 also causes pivoting of the control bar 95 in a clockwise direction, as shown in FIG. 1, to control the switch 100 for the motor for engagement with a forwardly extending projection 133 on the control bar 95 similar to the projection 116 which coacts with the control member 105. Additionally, a button 135, underlying member 106, functions similarly to the button 122 for activation of an idler wheel 136 which engages between the flywheel 63 and an enlargement 137 fixed to the reel spindle 32 to provide for fast speed operation of the reel spindle 32. This idler wheel 136 is mounted on a floating bracket 138 pinned at 138*a* to the rear of the base 30. The idler wheel is urged upwardly by a spring 139 connected between the bracket 138 and the mounting base. The button 135 has a link 140 extending downwardly with a shoulder engaging the upper end of the mounting bracket 138 whereby depression of the button 135 pivots the idler wheel 136 inwardly into driving engagement between the flywheel and the enlargement 137 on the reel spindle 32.

Provision is made for automatic reversal of tape travel when the end of travel of the tape in one direction is reached by the captured end of the tape stopping further rotation of the cassette reels and, accordingly of the reel spindles 31 and 32. The mechanism shown is not effective in the fast forward or fast reverse mode; however, it is to be understood that the device can be so modified. This mechanism includes a pair of sensing members 200 and 201 (FIG. 3) in the form of rollers which are alternately operative. The sensing member 201 is operative when the tape is passing from left to right as viewed in FIG. 1 and winding up on a reel driven by reel spindle 32. In this condition and referring to FIGS. 3 and 5, the drive shaft 64 and flywheel 63 are rotating in a clockwise direction. At the same time, the elastic belt 69, through the idler wheel 75, is rotating the drive spindle 32 n a clockwise direction. Because of the travel of the tape, the other reel of the cassette is functioning as a supply reel which is rotated by tape pull moving through the cassette, which results in rotation of the reel spindle 31. This motion of the supply reel spindle is used to hold the operative sensing member inactive but, upon stoppage of the tape and thus of the reel spindles, the sensing member can move into active position to reverse the drive of the tape.

Figure 3:
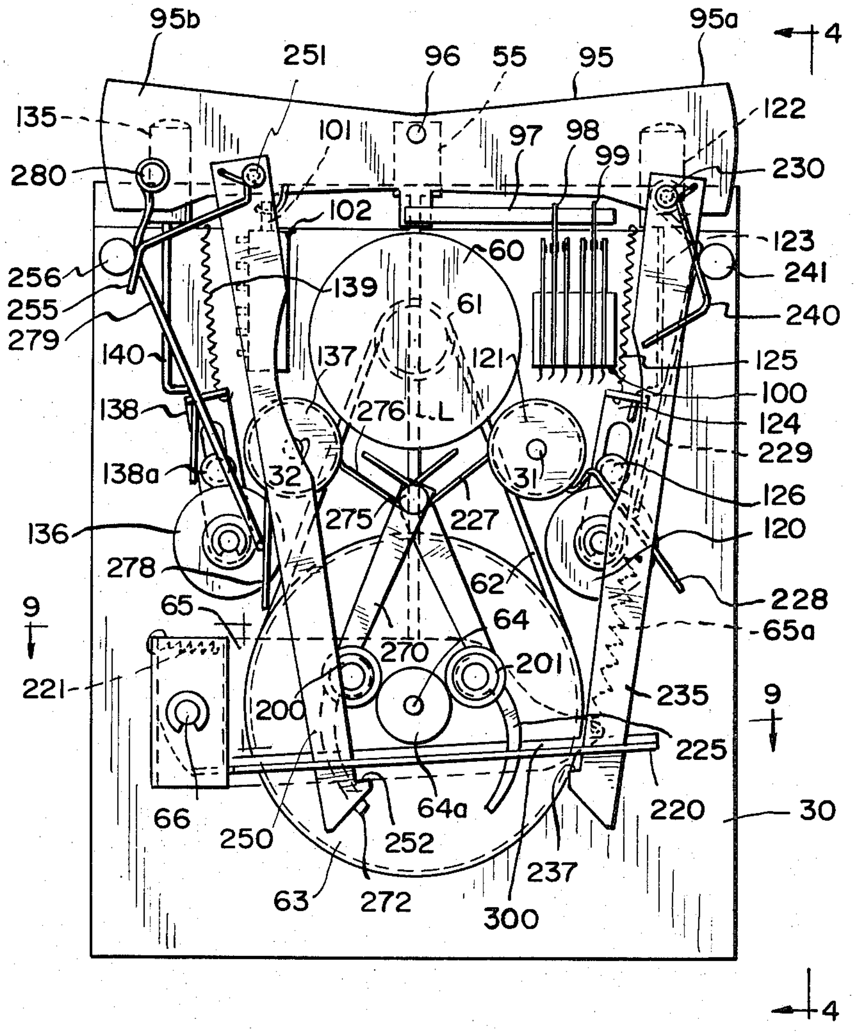
FIG. 3 is a rear elevational view of the tape cassette player with the parts positioned in an "off" condition.
Figures 5, 6:
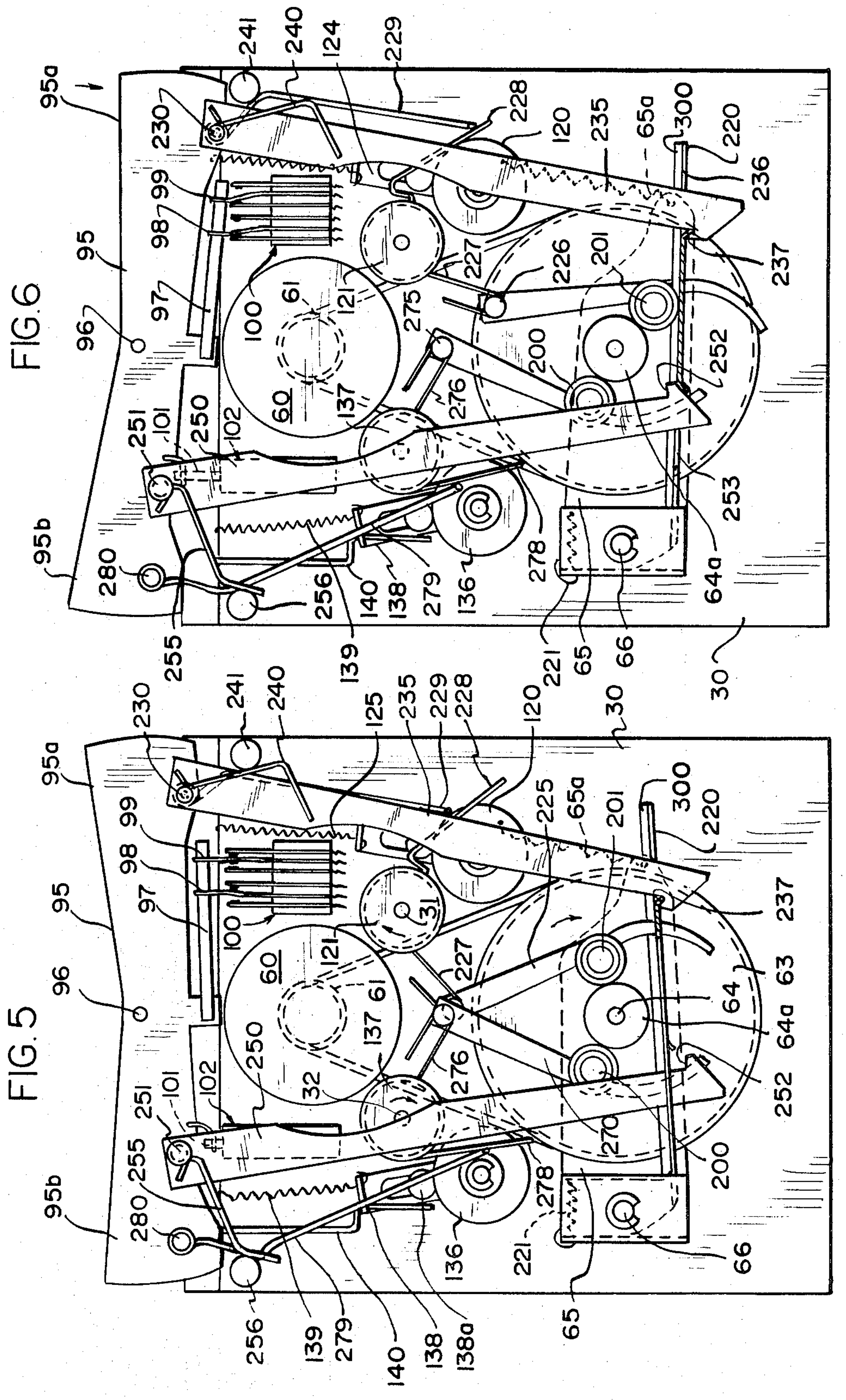
FIG. 5 is a view similar to FIG. 3 showing the automatic tape reversing mechanism in active position.
FIG. 6 is a view similar to FIG. 5 showing the tape reversal mechanism in cycle.

The construction coacting with the sensing members 200 and 201 includes a generally horizontally extending trip plate 220 which is pivoted on the fixed pin 66 and spring urged upwardly in a counterclockwise direction, as seen in FIG. 3, by a spring 221 connected between an upper end of the plate and the bracket 65. This plate 220 has a series of slots extending partially along the length thereof with there being a first slot 222 to receive and guide the lower curved end of an arm 225 which mounts the sensing member roller 201 and which, at its upper end, has a pin 226 received in a music wire member 227 which is partially wrapped around and fits in a groove in the enlargement 121 on the reel spindle 31. This member exerts a drag on the supply reel in addition to that caused by fingers 90 and 91 to further ensure tape wrap on the heads 33 and 34 because of back tension on the tape. The opposite end of the music wire member, as indicated at 228, is engageable by a wire form 229 carried by a rearward extension 230 of the main control bar 95. The lower curved end of arm 225 coacts with the music wire 227 in guiding the sensing member roller 201 for resting upon the enlargement 64a of the drive shaft 64. Assuming the condition previously described wherein tape is moving off the reel connected to the drive spindle 31 and the drive spindle 31 is rotating in a clockwise direction as viewed in FIG. 5 the friction engagement with the music wire 227 holds the arm 225 in an upper position. Pivoting of the control bar 95 has moved the wire form 229 to a position away from the end 228 of the music wire whereby the music wire can slip and permit downward movement of the sensing member 201 but which does not occur so long as the reel spindle 31 is rotating. When the tape stops and thus the reel spindle 31 stops, the weight of the arm 225 and roller 201 will cause lowering of the sensing member roller 201 and this movement is not prevented by the control wire 229 since it is moved to an out-of-the-way position of engagement with the music wire 227. The roller 201 moves into wedging relation between the enlargement 64*a* on the drive shaft 64 and the pivoted plate 220 by induced rotation from the shaft enlargement 64a. This depresses the plate 220 and pivots the control bar 95 to an opposite extreme position through a connecting link 235 which is pivoted to the pin 230 extending from the rear of the control bar 95 and as shown in FIG. 6. This link fits into a slot 236 in the pivoted trip plate 220 and has a catch 237 engageable under the trip plate whereby downward pivoting of the trip plate lowers the link 235 and pivots the control bar 95. This causes movement from the position of FIG. 5 to the position of FIG. 6. This link 235 has been thrown into operative position when the control bar end 95b was initially pressed to cause tape travel by a wire 240 engageable against a fixed post 241 extending rearwardly from the base 30 and with the wire connected to the upper end of the link 235. The link 235 is only thrown into operative engagement with the plate 220 when the end 95*b* of the control bar 95 has been depressed as viewed in FIG. 5 which causes tape travel from left to right as viewed in FIG. 1. In the neutral position of the control bar and when the right-hand end 95a thereof has been depressed, as viewed in FIG. 5, the link 235 by its own weight is out of engagement with the plate 220.

Three different conditions of the tape cassette player and particularly the automatic tape drive reversal mechanism are shown in FIGS. 3, 5 and 6. In FIG. 3, the parts of the tape cassette player are shown when the unit is not in operation and with the control bar 95 in its central position. The parts as positioned in FIG. 5 are as described above wherein the sensing member 201 is free to move downwardly except that it is frictionally held in an upper position by rotation of the enlargement 121 on the reel spindle 31. In this condition, the link 235 is latched to the trip plate 220. As shown in FIG. 6, the reel spindles have stopped rotating because the tape in the cassette has reached the captured end whereby the sensing member 201 is free to move downwardly and because of the rotation of the enlargement 64*a* of the drive shaft, it is wedged against the trip plate 220. In the condition shown in FIG. 6, the trip plate has been lowered to lower the link 235 and pivot the control bar 95 in a clockwise direction. The switch 100 has been reversed which causes reversal of rotation of shaft 64 and the sensing member 201 to roll out of wedge relation with the trip plate 220, and the trip plate can move upwardly to the position shown in FIG. 5. At this time the link 235 is unlatched from the trip plate and because of its weight, is free to swing outwardly and position the catch surface 237 out of operative relation with the trip plate 220.

A second link 250 similar to the link 235 extends upwardly and is fitted on a pin 251 extending rearwardly from the control bar 95. This link has a catch 252 beneath the trip plate 220 and the link extends through a slot 253 in the trip plate. The coaction of the link with the trip plate is determined by the position of the control bar 95 and a wire 225 connected to the upper end of the link and engageable against a fixed pin 256 extending rearwardly from the base 30. When the control bar 95 is depressed at end 95*a*, the end 95*b* of the control bar is raised and the wire 255 becomes effective to latch the link 250 to the trip plate 220 while in the other two positions of the control bar 95 the link 250, by its own weight, is out of latch relation with the trip plate 220.

The sensing member 200 in the form of a roller is carried on an arm 270 which has a curved lower end 272 fitted through a slot 271 in the trip plate 220 and has a pin 275 at the upper end movably received in a loop in a music wire 276 which fits around the enlargement 137 on the reel spindle 32 and which has an opposite end 278 engageable by a wire form 279 connected at its upper end to a pin 280 extending rearwardly from the control bar 95 and with a part of the wire form coacting with the fixed end 256 extending rearwardly from the base 30.

When tape is traveling from right to left as viewed in FIG. 1 with the reel spindle 31 driving the take up reel of the cassette, the drive shaft 64 and enlargement 64*a* thereof are traveling in a counterclockwise direction, as viewed in FIG. 3, and the reel spindle 32 is rotating in a counterclockwise direction. This action occurs when the control bar 95 has the end 95a thereof depressed. This moves the wire form 279 away from the end 278 of the music wire passing about the enlargement 277 on the reel spindle 32. The music wire 276 is still held up by the frictional engagement with the rotating enlargement 137 which holds the sensing member 200 upwardly away from the trip plate 220. As soon as the tape stops, the music wire is free to descend and the sensing member roller 200 descends into wedging relation due to the counterclockwise rotation of the shaft enlargement 64*a* to wedge into the trip plate 220 and cause pivoting of the trip plate which, through the latched relation to the link 250, causes reversal of the position of the control bar 95 to reverse the connections of the switch 100 and the switch 102 and condition the player and cause the tape to travel in the opposite direction. The roller 200 rolls out of wedging relation upon reversal of drive shaft 64 rotation. As the trip plate 220 rises, the link 250 swings out under its own weight to remove catch 252 from the trip plate 220.

When the control bar 95 is in the neutral position of FIG. 3, the wire forms 229 and 279 engage music wires 228 and 278, respectively, and maintain sensing rollers 200 and 201 elevated.

With the tape cassette player now described, it will be evident that a tape carried by a cassette C can have multitracks thereof played in sequence by automatic reversal of the direction of tape travel. Normal loading and unloading of the cassette is accomplished by operation of the push-button 55. After loading of a cassette C, play of the tape in one direction or the other is determined by positioning of the control bar 95 and by depression of either end 95*a* or end 95*b* thereof with the depression controlling the position of the motor switch 100 and of the electrical control switch 102. Depression of the control bar 95 sets the automatic reversal mechanism which is responsive solely to stopping of the tape in the cassette and which does not require any signaling from a particular portion of the tape but only sensing the inherent function of tape stoppage as is required in a cassette where the ends of the tape are captured on the respective reels. The tape in the cassette can repeatedly play back and forth with automatic reversal at each end of the tape travel. When it is desired to find a particular spot on the tape rapidly, either fast forward or fast reverse operation can be accomplished by depressing the secondary control member 105 or 106 which shifts the tape drive wheel 37 out of engagement with the tape and causes a fast rotation of one or the other of the reel spindles 31 and 32 by connecting an intermediate fast drive for the reel. The tape cassette C is easily loaded and unloaded by movement in a path directly towards the tape heads and tape drive wheel and requires only an interfitting with the reel spindles 31 and 32 and does not require any interfitting with tape drive capstans or the like.

The tape cassette player can be brought to neutral at any time by depression of push-button 55. This lowers the link L to lower the drive shaft 64 and the reduced diameter section 64A thereof. The latter section engages an upturned flange 300 on the trip plate 220 to lower the trip plate and cause centering of the control bar 95 through either of the links 235 or 250.

I claim:

1. A tape player for a generally planar cassette having spaced top and bottom walls and two interior tape reels with an exposed length of tape along an edge of the cassette and between said walls comprising, a base, a tape head and a large diameter relatively thin rotatable tape drive wheel having a friction surface mounted on said base generally in line with and adjacent said head, means on said base for holding a cassette positioned in a plane normal to the axis of rotation of said tape drive wheel and with said exposed length of tape in curvingly-deflected engagement with said head and in position adjacent said tape drive wheel, means for moving said tape drive wheel in the plane of the cassette and between said cassette walls toward the tape and a nonrotatable member carried by the cassette, said member being mounted in the cassette on a yieldable spring and being compressible to conform to the shape of the tape drive wheel and assure complete contact of the tape with the tape drive wheel across the width of the tape drive wheel, a pair of drive spindles for said reels, a reversible drive for said tape drive wheel, means for driving one or the other of said reel drive spindles dependent upon the direction in which said tape drive wheel is driven, means for imparting a drag to the reel drive spindle which is not driven to provide back tension on the tape and ensure sufficient tape wrap on said heads for proper transducing, a control mechanism for setting the direction of tape travel, a control mechanism for setting the direction of tape travel, including a movable member having at least two positions, and means sensing non-rotation of the reels responsive to termination of tape travel in the cassette to shift said movable member from one position to the other and reverse the direction of tape travel including a movable plate, a link connecting said movable member to said plate, and an element for moving said plate to cause said link to shift said member, said element being movably mounted, and means responsive to rotation of a reel spindle to maintain said element inactive and responsive to stopping of a reel spindle to activate said element.

2. A tape player for a generally planar cassette having spaced top and bottom walls and two interior tape reels with an exposed length of tape along an edge of the cassette and between said walls comprising, a base, a tape head and a large diameter relatively thin rotatable tape drive wheel having a friction surface mounted on said base generally in line with and adjacent said head, an arm rotatably mounting said tape drive wheel, means on said base for holding a cassette positioned in a plane normal to the axis of rotation of said tape drive wheel and with said exposed length of tape in curvingly-deflected engagement with said head and in position adjacent said tape drive wheel, means pivotably mounting said arm on the base for movement about an axis normal to the plane of the cassette, means for moving said tape drive wheel in the plane of the cassette and between said cassette walls toward the tape and a non-rotatable member carried by the cassette, said member being mounted in the cassette on a yieldable spring and being compressible to conform to the shape of the tape drive wheel and assure complete contact of the tape with the tape drive wheel across the width of the tape drive wheel, a pair of drive spindles for said reels, a reversible drive for said tape drive wheel, means for driving one or the other of said reel drive spindles dependent upon the direction in which said tape drive wheel is driven, means for imparting a drag to the reel drive spindle which is not driven to provide back tension on the tape and ensure sufficient tape wrap on said heads for proper transducing, said reversible drive including a drive shaft adjacent the friction surface of the tape drive wheel and having a flywheel, means mounting said drive shaft for movement toward and away from said tape drive wheel, means urging said drive shaft toward the tape drive wheel to urge the tape drive wheel toward the non-rotatable member carried by the cassette, and means limiting the movement of the tape drive wheel.

3. A tape player for a generally planar cassette having spaced top and bottom walls and two interior tape reels with an exposed length of tape along an edge of the cassette and between said walls comprising, a base, a tape head and a large diameter relatively thin rotatable tape drive wheel having a friction surface mounted on said base generally in line with and adjacent said head, means on said base for holding a cassette positioned in a plane normal to the axis of rotation of said tape drive wheel and with said exposed length of tape in curvingly-deflected engagement with said head and in position adjacent said tape drive wheel, means for moving said tape drive wheel in the plane of the cassette and between said cassette walls toward the tape and a non-rotatable member carried by the cassette, said member being mounted in the cassette on a yieldable spring and being compressible to conform to the shape of the tape drive wheel and assure complete contact of the tape with the tape drive wheel across the width of the tape drive wheel, a pair of drive spindles for said reels, a reversible drive for said tape drive wheel, means for driving one or the other of said reel drive spindles dependent upon the direction in which said tape drive wheel is driven, and means for imparting a drag to the reel drive spindle which is not driven to provide back tension on the tape and ensure sufficient tape wrap on said heads for proper transducing, said means for driving one or the other of said reel drive spindles including an endless belt movable with said tape drive wheel, a pair of reel drive members positioned one on each of said drive spindles and adjacent opposed lengths of said endless belt, and a pair of rotatable clutch members mounted on said base for movement lengthwise of a belt length and each engaged between a belt length and a reel drive member whereby direction of belt travel will cause one or the other of said rotatable clutch members to climb along said belt and tightly engage both said belt and the coacting reel drive member to drive the latter from the belt.

* * * * *